(12) United States Patent
Gundotra et al.

(10) Patent No.: US 9,087,131 B1
(45) Date of Patent: Jul. 21, 2015

(54) AUTO-SUMMARIZATION FOR A MULTIUSER COMMUNICATION SESSION

(71) Applicant: Google Inc., Mountain View, CA (US)

(72) Inventors: Vivek Paul Gundotra, Los Gatos, CA (US); Amar Gandhi, Mountain View, CA (US)

(73) Assignee: Google Inc., Mountain View, CA (US)

( * ) Notice: Subject to any disclaimer, the term of this patent is extended or adjusted under 35 U.S.C. 154(b) by 233 days.

(21) Appl. No.: 13/717,850

(22) Filed: Dec. 18, 2012

(51) Int. Cl.
*G06F 17/30* (2006.01)

(52) U.S. Cl.
CPC .... *G06F 17/30864* (2013.01); *G06F 17/30477* (2013.01); *G06F 17/30867* (2013.01)

(58) Field of Classification Search
CPC .......... G06F 17/3053; G06F 17/30867; G06F 17/30554; G06F 17/30; G06F 17/212; G06F 17/24; G06F 17/289; G06F 17/30064; G06F 17/30241; G06F 17/30345; G06F 17/3089; G06F 17/2836; G06F 17/2881; G06F 17/30268; G06F 17/30283; G06F 17/30289; G06F 17/30483; G06F 17/30522; G06F 17/30631; G06F 17/30864; G06F 17/30873; G06F 17/30902; G06F 17/30958; G06F 17/30988; G06F 17/30994
USPC .......................................... 707/748, 754, 758
See application file for complete search history.

(56) References Cited

U.S. PATENT DOCUMENTS

| 7,152,092 | B2 | 12/2006 | Beams et al. | |
|---|---|---|---|---|
| 7,577,246 | B2 * | 8/2009 | Idan et al. | 379/265.01 |
| 2012/0179672 | A1 | 7/2012 | Van Wie et al. | |
| 2013/0124322 | A1 * | 5/2013 | Boland et al. | 705/14.58 |
| 2013/0326406 | A1 * | 12/2013 | Reiley et al. | 715/810 |

OTHER PUBLICATIONS

P. Barthelmess et al., "The Neem Platform: An Evolvable Framework for Perceptual Collaborative Applications", Journal of Intelligent Information Systems, 2005, 34 pages.
Huang et al., "Face Detection and Smile Detection", Dept. of Computer Science and Information Engineering, National Taiwan University, 2000, 8 pages.

* cited by examiner

*Primary Examiner* — Shahid Alam
*Assistant Examiner* — Andalib Lodhi
(74) *Attorney, Agent, or Firm* — Patent Law Works LLP

(57) ABSTRACT

A system and method for summarizing a multiuser communication session is disclosed. A processing unit receives data about the multiuser communication session. A session management module manages the multiuser communication session. A feature extraction module extracts features from the data. An analyzing module analyzes the features to identify segments of interest for the multiuser communication session including a beginning and an end of each segment of interest and a list of participants in each segment of interest. A summarizing engine generates a summary for the multiuser communication session including at least one segment of interest.

20 Claims, 11 Drawing Sheets

Figure 5A

AUTO-SUMMARIZATION FOR A MULTIUSER COMMUNICATION SESSION

BACKGROUND

As technology improves, multiuser communication sessions (e.g., video conferences, interactive shows, etc.) are becoming an increasingly popular way for people to communicate. People who are invited to join the multiuser communication session (referred hereafter as "MCS") may not be online at the right time to participate in the MCS even though they are interested in the MCS. Sometimes participants of the MCS want to see the MCS again. Many social networks can record the entire MCS and display the video afterwards. However, many users do not have the time to view the entire video.

SUMMARY

In some embodiments, the specification describes a computer-implemented method comprising: receiving data about a multiuser communication session, extracting, features from the data, scoring each segment in the multiuser communication session, analyzing the features to identify segments of interest for the multiuser communication session based at least in part on the scores, the segments of interest including a beginning and an end of each segment of interest and a list of participants in each segment of interest, determining social affinity scores between a user in a social network and participants in at least one segment of interest, determining personalized characteristics for the user associated with the at least one segment of interest based at least in part on the social affinity scores and generating a summary for the multiuser communication session including the at least one segment of interest.

In some embodiments, the operations further include determining a list of criteria that the summary should meet and wherein selecting the at least one segment of interest is based at least in part on the list of criteria. The operations further include determining a format of the summary and wherein selecting the at least one segment of interest is based at least in part on the format.

In some embodiments, the features further include determining the social affinity scores between the user in the social network and the participants in the at least one segment of interest based on at least one of user interactions between the user and the participants and relationship information between the user and the participants. The features further include the list of criteria comprising at least one of time duration, a number of appearances of a specific feature in the summary and a number of appearances of every user who joined the multiuser communication session in the summary. The features further include the extracted features comprising at least one of a video feature, an audio feature and a text feature. The features further include the video feature comprising at least one of a face of a participant, a face indicative of an emotion and display of a specific item. The features further include the audio feature comprising at least one of laughter by at least one participant, crying by at least one participants, a number of the participants that talked at once, a volume of the participants talking, text from the participants that talked, a background sound and silent time. The features further include the text feature comprising at least one of an appearance of specific text and a number of appearances of the specific text.

The specification describes a summarizing application that advantageously summarizes a multiuser communication session (MCS), such as a video or other type of conference, to generate a summary that includes at least one segment of interest in the MCS.

BRIEF DESCRIPTION OF THE DRAWINGS

The specification is illustrated by way of example, and not by way of limitation in the figures of the accompanying drawings in which like reference numerals are used to refer to similar elements.

FIGS. 5A and 5B are example graphic representations of notifications about a MCS to a user.

DETAILED DESCRIPTION

Figure 1:
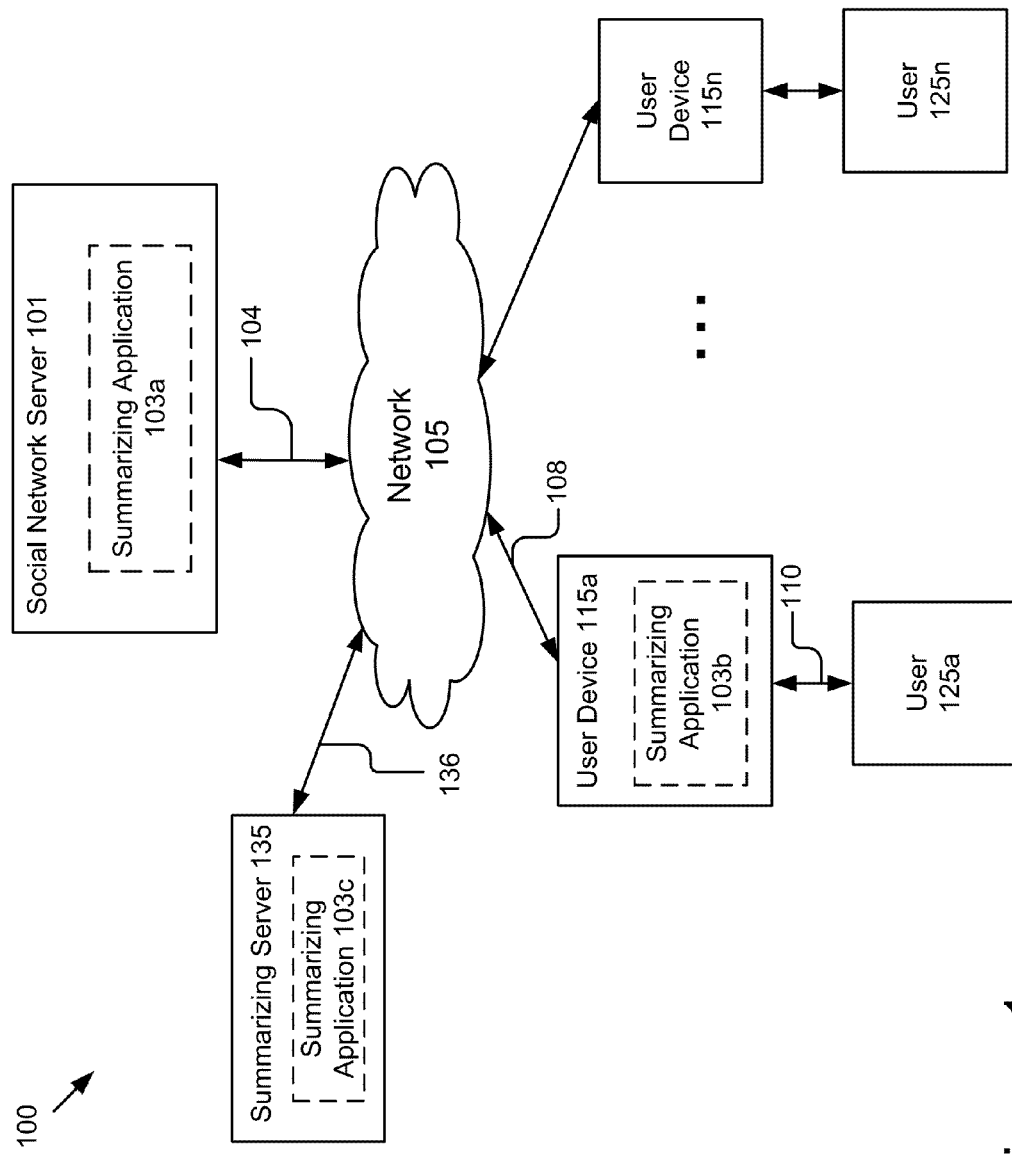
FIG. 1 is a block diagram illustrating an example system for summarizing a MCS.

In one embodiment, the system includes a social network application, a feature extraction module, an analyzing module, a summarizing engine and a user interface engine. The feature extraction module receives data about a multiuser communication session (MCS) and extracts the features from the data based at least in part on user interactions in the MCS. The data about the MCS includes video data, audio data, textual data and metadata associated with the MCS. The feature includes a video feature, an audio feature or a text feature. In one embodiment, the video feature includes at least one of a face of a participant, a face indicative of an emotion and display of a specific item. For example, the feature extraction module extracts features based on detecting smiling faces or crying faces shown in the MCS using a recognition algorithm. In another example, the feature extraction module extracts features based on recognizing the logo of a beer brand or a party hat that indicates a MCS is occurring. In one embodiment, the audio feature includes at least one of laughter by participants, crying by the participants, a number of the participants talking at once, a volume of the participants talking, text from the participants that talked, a background sound and silent time. For example, the feature extraction module extracts background music based on a sound recognition algorithm to identify whether music associated with a party was being played. In one embodiment, the text feature includes at least one of appearance of specific text and a number of appearances of the specific text. For example, the feature extraction module extracts text messages including phrases like "this is awesome."

The analyzing module receives the features from the feature extraction module and analyzes the features to identify segments of interest in the MCS. In one embodiment, the analyzing module analyzes the features associated with each segment in the MCS, scores each segment and identifies the segments of interest based on the scores. The segments of interest include at least a beginning and an end of each segment and a list of participants in each segment. For example, the analyzing module analyzes an audio feature and a video feature associated with a segment in the MCS, determines that participants are talking more loudly in the segment and the number of faces of the participants are increasing from the beginning to the end of the segment (i.e., more users join the MCS during the segment) and as a result assigns a higher score to the segment because both louder voices and more participants mean a more interesting segment. Conversely, if the analyzing module receives an audio feature indicating that no one is talking in a segment, the analyzing module assigns a low score to the segment since no one shows interest in the segment. In one embodiment, the analyzing module identifies the "most fun" segments according to the highest scores and the "least fun" segments according to the lowest scores. Other scoring methods are possible, for example, where 0 indicates the least fun segment and 100 indicates the most fun segment. In one embodiment, the analyzing module transmits the segments of interest and associated scores to the summarizing engine.

The summarizing engine selects at least one segment of interest from the segments of interest and generates the summary to include the at least one segment of interest. In one embodiment, the summarizing engine selects segments of interest that have the highest scores. In another embodiment, the summarizing engine also determines a format of the summary and selects the at least one segment of interest based at least in part on the format. For example, if the summarizing engine uses a series of animated pictures as a summary of the MCS, the summarizing engine may include a segment having the largest amount of visual effects (e.g., a mask following a first participant's movement, a second participant wearing a moustache, etc.) in the summary to have a strong visual appeal. In yet another embodiment, the summarizing engine further determines a list of criteria that the summary should meet and selects the at least one segment of interest based at least in part on the list of criteria. The list of criteria includes at least one of time duration, a number of appearances of a specific feature and a number of appearances of every user who joined the MCS. For example, the summarizing engine selects a segment of interest that is within a predetermined time duration.

The system provides the summary of the MCS to all users, a user who may be interested in the MCS or a user who missed the MCS. In one embodiment, the summarizing engine determines characteristics for all users associated with the at least one segment of interest. For example, the summarizing engine determines that the video feature indicating that most participants are smiling in the segment of interest should be presented in a first picture of a summary. In another embodiment, the summarizing engine determines personalized characteristics for a user associated with the at least one segment of interest. In one embodiment, the summarizing engine receives social affinity scores between the user and participants in the at least one segment of interest and determines the personalized features based on the social affinity scores. For example, the summarizing engine puts more pictures that have a first user on them in a summary customized for a second user because the summarizing engine determines a higher social affinity score between the first user and the second user than other participants. In one embodiment, the social network application determines the social affinity scores based on user interactions between the user and the participants and relationship information between the user and the participants. The summarizing engine generates the summary to include the at least one segment of interest based on characteristics or personal characteristics associated with the at least one segment of interest. The user interface engine receives the summary and provides graphic data to present the summary for display.

FIG. 1 illustrates a block diagram of a system 100 for summarizing a MCS. The illustrated system 100 includes user devices 115a, 115n that are accessed by users 125a, 125n, a social network server 101 and a summarizing server 135. In the illustrated example, these entities are communicatively coupled via a network 105. In FIG. 1 and the remaining figures, a letter after a reference number, for example, "115a" is a reference to the element having that particular reference number. A reference number in the text without a following letter, for example, "115" is a general reference to different instances of the element bearing that reference number. Although only two devices are illustrated, persons of ordinary skill in the art will recognize that arbitrary number of user devices 115n is available to arbitrary number of users 125n.

In one embodiment, the summarizing application 103a is operable on the social network server 101, which is coupled to the network 105 via signal line 104. Although only one social network server 101 is shown, persons of ordinary skill in the art will recognize that multiple servers can be present. The social network server 101 includes software for generating and managing a social network. The social network includes relationships that are defined in a social graph. The social graph is a mapping of users in a social network and how they are related to each other.

In another embodiment, the summarizing application 103b is stored on the summarizing server 135, which is connected to the network 105 via signal line 136. In this embodiment, the summarizing server 135 does not includes software for generating and managing a social network. In examples where the social network is implicated, the summarizing application 103c on the summarizing server 125 queries the social network server 101 for information. In one embodiment, the social network server 101 and the summarizing server 135 are the same server or are at least controlled by the same entity.

In yet another embodiment, the summarizing application 103c is stored on a user device 115a, which is connected to the network 105 via signal line 108. In one example, the summarizing application 103c is a thin-client application that includes part of the summarizing application 103 on the user device 115a and part of the summarizing application 103 on the social network server 101 to summarize a MCS to include at least one segment of interest in the MCS. The user 125a interacts with the user device 115a via signal line 110. The user device 115a, 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network.

The network 105 is a conventional type, wired or wireless, and has arbitrary number of configurations, for example, as a star configuration, token ring configuration or other configurations known to those skilled in the art. Furthermore, the network 105 includes a local area network (LAN), a wide area network (WAN) (e.g., the Internet), and/or other interconnected data paths across which multiple devices can communicate. In yet other instances, the network 105 is a peer-to-peer network. The network 105 is also coupled to or includes portions of a telecommunications network for sending data in a variety of different communication protocols. In one embodiment, the network 105 includes Bluetooth communication networks or a cellular communications network for sending and receiving data, for example, via short messaging service (SMS), multimedia messaging service (MMS), hypertext transfer protocol (HTTP), direct data connection, WAP, email, etc.

Figure 2A:
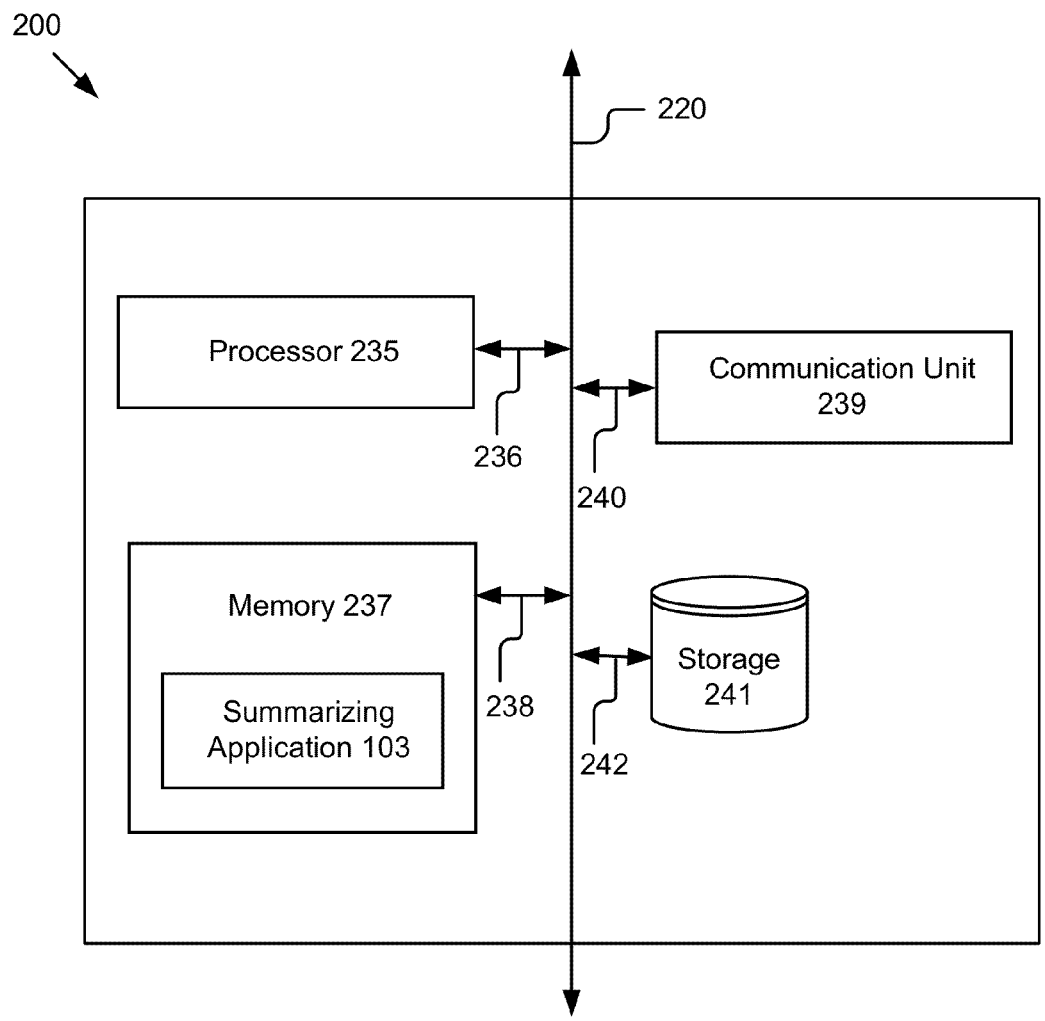
FIG. 2A is a block diagram illustrating example hardware implementing the functionality of summarizing a MCS.

Referring now to FIG. 2A, example hardware implementing the functionality of summarizing a MCS is shown in more detail. FIG. 2A is a block diagram of a computing device 200 that includes a processor 235, memory 237, a communication unit 239 and storage 241. In one embodiment, the computing device 200 is the social network server 101. In another embodiment, the computing device 200 is the summarizing server 135. In yet another embodiment, the computing device 200 is the user device 115a.

The processor 235 includes some or all of an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2A, multiple processors are included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may include code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 239 transmits and receives data to and from the computing device 200. The communication unit 239 is coupled to the bus 220 via signal line 240. In one embodiment, the communication unit 239 includes a port for direct physical connection to the network 105 or to another communication channel. For example, the communication unit 239 includes a USB, SD, CAT-5 or similar port for wired communication with the user device 115. In another embodiment, the communication unit 239 includes a wireless transceiver for exchanging data with the user device 115 or any other communication channel using one or more wireless communication methods, such as IEEE 802.11, IEEE 802.16, BLUETOOTH® or another suitable wireless communication method.

In another embodiment, the communication unit 239 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In another embodiment, the communication unit 239 includes a wired port and a wireless transceiver. The communication unit 239 also provides other conventional connections to the network for distribution of files and/or media objects using standard network protocols such as TCP/IP, HTTP, HTTPS and SMTP as will be understood to those skilled in the art.

The storage device 241 can be a non-transitory memory that temporarily stores data used by the summarizing application 103, for example, a cache. The storage device 241 may be a dynamic random access memory (DRAM) device, a static random access memory (SRAM) device, flash memory or some other memory device known in the art. In one embodiment, the storage device 241 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In the illustrated embodiment, the storage device 241 is communicatively coupled by the bus 220 for communication with the other components of the computing device 200 via signal line 242. Although only one storage device is shown in FIG. 2A, multiple storage devices may be included. In another embodiment, the storage device 241 may not be included in the computing device 200 and can be communicatively coupled to the computing device 200 via the network 105.

Figure 2B:
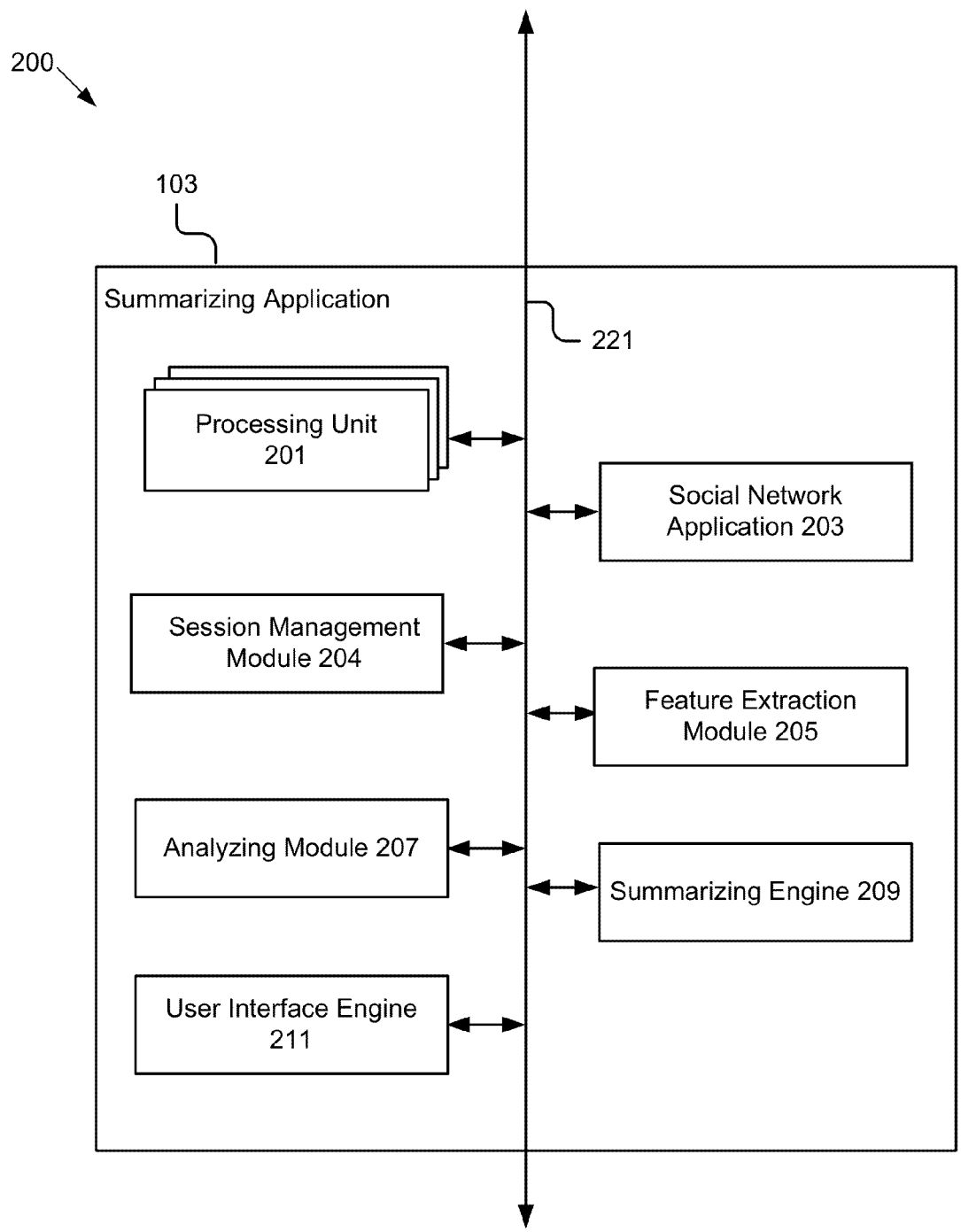
FIG. 2B is a block diagram illustrating an example summarizing application.

Referring now to FIG. 2B, an example summarizing application 103 is shown in more detail. In one embodiment, the summarizing application 103 includes a processing unit 201, a social network application 203, a session management module 204, a feature extraction module 205, an analyzing module 207, a summarizing engine 209 and a user interface engine 211 that communicate over the software communication mechanism 221. Software communication mechanism 221 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 220, a combination thereof, etc.

The processing unit 201 is software including routines for receiving data and transmitting the data to an appropriate component. In one embodiment, the processing unit 201 can be a set of instructions executable by the processor 235 to provide the functionality described below for receiving and transmitting the data. In another embodiment, the processing unit 201 can be stored in the memory 237 of the computing device 200 and can be accessible and executable by the processor 235. The processing unit 201 may be adapted for cooperation and communication with the processor 235 and other components of the computing device 200 via the software communication mechanism 221.

In one embodiment, the processing unit 201 receives data about a MCS via the communication unit 239. The data includes video data, audio data, textual data and metadata associated with the MCS. In one embodiment, the metadata associated with MCS includes at least one of a date and a time that the MCS started, a time length that the MCS lasted, a title of the MCS, a short text description of the MCS, etc. The processing unit 201 transmits the data to the appropriate module of the summarizing application 103. For example, the processing unit 201 transmits the data to the feature extraction module 205 for extracting features from the data. In another embodiment, the processing unit 201 receives data (e.g., affinity scores, user interactions, etc.) from the social network application 203 and transmits the data to an appropriate component.

In some instances, there are multiple processing units 201 that each receive data from a different data source. In some examples, the data from the different data sources is stored separately as partitioned data. In other instances, the data is received by the same processing unit 201. The processing unit 201 transmits the data to the storage 241.

The social network application 203 is software including routines for generating and managing a social network. In one embodiment, the social network application 203 can be a set of instructions executable by the processor 235 to provide the functionality described below for generating and managing the social network. In another embodiment, the social network application 203 can be stored in the memory 237 of the computing device 200 and can be accessible and executable by the processor 235. The social network application 203 may be adapted for cooperation and communication with the processor 235 and other components of the computing device 200 via the software communication mechanism 221.

In some embodiments, the social network application 203 is part of the summarizing application 103 when the summarizing application 103 is stored on the social network server 101. When the summarizing application 103 is stored on the summarizing server 135, the social network application 203 is software that independently operates on the social network server 101.

In one embodiment, the social network application 203 manages the social network by handling registration of users, creating a user profile, etc. The social network application 203 also manages the association of different actions with the user profile including the publication of posts (e.g. text, links or media) to a selected audience, the publication of comments, indications of acknowledgement (e.g. approval, disapproval, thumbs up, thumbs down, like, dislike. etc.), uploading of media (e.g. photos, videos, etc.), check-ins to different locations and other actions associated with a social network. In another embodiment, the social network application 203 incorporates with other applications (not shown) to host a MCS at the social network server 101. For example, the social network application 203 retrieves profile information including a profile photo and a name for providing presence awareness of one or more participants of the MCS.

In one embodiment, the social network application 203 creates a social graph and an interest graph that are stored in the storage 105. The social graph includes the relationship between people in a social network and the interest graph that includes a mapping of relationships between interests associated with the users. For the social graph, when a first user follows a second user, the relationship is a first-degree relationship. If the second user follows a third user that the first user does not follow, the first user has a second-degree relationship with the third user. This relationship can also be described in terms of social affinity. The first user has a closer social affinity to the second user than the third user. For the interest graph, one example would be that user A and user B both share an interest in ice cream, and user B and user C both share an interest in sharks.

In one embodiment, the social network application 203 also generates an affinity score between a pair of users in the social network. For example, the social network application 203 generates a high affinity score for two users that follow each other and that frequently interact with each other. The social network application 203 regularly updates the affinity score between the users. For example, if a first user removes a second user from a group or stops being friends with the second user, the social network application 203 reduces the affinity score between the first and second user to reflect the relationship change. In one embodiment, the social network application 203 determines social affinity scores between a user in a social network and participants in a segment of the MCS. The social network application 203 transmits the data (e.g., user activity data, affinity scores, social graph information, etc.) to the processing unit 201 for processing and organizing with other data sources.

The session management module 204 is software including routines for generating the MCS and instructing the user interface engine 211 to generate graphical data for displaying the multi-user communication session. In one embodiment, the session management module 204 can be a set of instructions executable by the processor 235 to provide the functionality described below for generating a MCS. In another embodiment, the session management module 204 can be stored in the memory 237 of the computing device 200 and can be accessible and executable by the processor 235. In either embodiment, the session management module 204 can be adapted for cooperation and communication with other components of the summarizing application 103.

In one embodiment, the session management module 204 generates a multi-user communication session responsive to receiving a user request for starting the multi-user communication session at the social network. The multi-user communication session comprises at least one of a video conference, an audio conference and instant messaging. In one embodiment, the session management module 204 generates a multi-user communication session by interacting with audio and video capture devices of the user device 115 to obtain a real-time audio-video synchronous communication data stream of the user 125. For example, the session management module 204 interfaces with a software driver stored on the user device 115 that controls the functionality of a microphone and a video camera (e.g., a webcam or forward facing camera) included in the user device 115. The audio-video data stream captured by a user device 115 may be encoded using various audio and video codecs and then encapsulated into a container before transmitting to the user interface engine 211. In another embodiment, the session management module 204 generates a multi-user communication session that allows users participating in the session to share documents, a scratchpad and computing device screens with one another.

In one embodiment, the session management module 204 instructs the user interface engine 211 to generate an overlay on the display of additional features to make the MCS more fun or useful. For example, the session management module 204 instructs the user interface engine 211 to generate bunny ears that the user can place on another user participating in the MCS.

The feature extraction module 205 is software including routines for receiving data about a MCS from the session management module 204 and extracting features from the data. In one embodiment, the feature extraction module 205 can be a set of instructions executable by the processor 235 to provide the functionality described below for receiving the data and extracting the features from the data. In another embodiment, the feature extraction module 205 can be stored in the memory 237 of the computing device 200 and can be accessible and executable by the processor 235. The feature extraction module 205 may be adapted for cooperation and communication with the processor 235 and other components of the computing device 200 via the software communication mechanism 221.

In one embodiment, the feature extraction module 205 receives data about a MCS from the session management module 204, determines segments of the MCS and extracts features associated with each segment of the MCS from the received data. The received data includes video data, audio data, textual data and metadata associated with the MCS. In one embodiment, the feature extraction module 205 retrieves the time length of the MCS from the metadata associated with the MCS, divides the MCS to evenly distributed time slots and specifies each time slot as a segment of the MCS. For example, the feature extraction module 205 determines six segments for a 24 minute MCS and each segment is four minutes long. In another embodiment, the feature extraction module 205 determines a beginning of a segment based on interesting content. For example, the feature extraction module 205 divides the MCS into a first segment by marking a first part where everyone in the video is laughing and a second segment where participants are saying positive things and smiling.

The feature extraction module 205 extracts features associated with each segment of the MCS based on user interactions in each segment of the MCS. In one embodiment, the features include at least one of a video feature, an audio feature and a text feature.

In one embodiment, the video feature includes a face of a participant or a face indicative of an emotion. In one embodiment, the feature extraction module 205 identifies one or more faces of multiple participants in the MCS using a facial recognition algorithm. In another embodiment, the feature extraction module 205 detects smiling faces or crying faces shown in the MCS based on a facial recognition algorithm. For example, the facial recognition algorithm identifies landmarks on a face including a position of the eyes, nose, cheekbones, jaw and mouth. To determine whether the participant is smiling or crying, the feature extraction module 205 determines the location of areas of the face associated with facial expressions, for example, the edges of the pupils, the corners of the mouth and the outer and inner edges of the eyebrow as compared to a baseline of neutral expressions. For example, a user that is crying will have edges of the mouth that are below the baseline.

In some embodiments, the feature extraction module 205 tracks the movement in these areas across the video to identify when the participants start to make an expression. This can help with the accuracy of detecting the expression because it makes establishing the baseline expression easier. For example, if a user has a perpetual scowl, an absence of a scowl could be an indication of happiness.

In another embodiment, the video feature includes a display of a specific item. In one embodiment, the feature extraction module 205 determines that an item such as a book, a photo or a phone screen appears in the MCS using a computer vision algorithm. In another embodiment, the feature extraction module 205 identifies a specific item that indicates a MCS is going on from the received data. For example, the feature extraction module 205 recognizes the logo of a beer brand or a party hat that indicates the MCS is taking place. In yet another embodiment, the feature extraction module 205 recognizes additional content that is generated by the user interface engine 211. For example, the feature extraction module 205 recognizes that a participant is wearing a moustache or an antler in a segment of the MCS. In another example, the feature extraction module 205 discovers that many participants are waving hands and dancing with music.

In one embodiment, the audio feature includes at least one of laughter by participants, crying by the participants, a number of the participants talking at once, a volume of the participants talking, a speech to text conversation of the audio from the participants that talked, a background sound and silent time. For example, the feature extraction module 205 extracts background music based on a sound recognition algorithm to identify whether music associated with a party was being played. In another example, the feature extraction module 205 determines that many participants talk loudly or even shout in a segment of the MCS.

In one embodiment, the text feature includes at least one of an appearance of text and a number of appearances of the text. In one embodiment, the text is indicative of a participant's emotion in a segment of the MCS. For example, the feature extraction module 205 identifies text messages such as "haha," "kekeke" or "LOL" indicating that a participant is laughing. In another embodiment, the specific text is an expression of a participant's negative or positive feeling to a segment of the MCS. For example, the feature extraction module 205 extracts text messages including phrases like "this is awesome" or "it sucks." In yet another embodiment, the specific text provides a hint of whether a participant feels negatively or positively to a segment of the MCS. For example, the feature extraction module 205 detects a message "I have to call Mary. She's got to see this" from Tom in a segment of the MCS. This message implies that Tom likes the segment of the MCS because Tom wants to share it with Mary.

In one embodiment, the feature extraction module 205 transmits the extracted video features, audio features and text features to the analyzing module 207. In another embodiment, the feature extraction module 205 also stores the features in the storage 241.

The analyzing module 207 is software including routines for receiving features from the feature extraction module 205 and analyzing the features to identify segments of interest in a MCS. In one embodiment, the analyzing module 207 can be a set of instructions executable by the processor 235 to provide the functionality described below for analyzing the features to identify the segments of interest in the MCS. In another embodiment, the analyzing module 207 can be stored in the memory 237 of the computing device 200 and can be accessible and executable by the processor 235. The analyzing module 207 may be adapted for cooperation and communication with the processor 235 and other components of the computing device 200 via the software communication mechanism 221.

In one embodiment, the analyzing module 207 receives features including at least one of a video feature, an audio feature and a text feature from the feature extraction module 205, analyzes the features associated with each segment in the MCS, scores each segment based on the features and identifies segments of interest based on the scores. For example, the analyzing module 207 analyzes an audio feature and a video feature associated with a segment in the MCS, determines that participants are talking more loudly in the segment and the number of faces of the participants is increasing from the beginning to the end of the segment (e.g., more users join the MCS during the segment) and as a result assigns a higher score to the segment because both louder voices and more participants mean a more interesting segment. Conversely, if the analyzing module 207 receives an audio feature indicating that no one is talking in a segment, the analyzing module 207 assigns a low score to the segment since no one shows interest in the segment.

In one embodiment, the analyzing module 207 analyzes the features (e.g., by determining a frequency of appearances of a phrase, a number of faces showing on the screen, a gesture of a user, etc.) to determine "fun" conditions that contribute to a high score of a segment of the MCS. The "fun" conditions include, but are not limited to, many users being present in the segment, many participants talking at once, many participants talking loudly, many participants sending text messages, many participants smiling or laughing, many participants are wearing moustaches or antlers in the segment, many participants are watching a popular video together, many participants are acting concurrently (e.g., waving hands or singing at the same time), invitations are being sent out to other users, other users are participating in the segment, etc.

In another embodiment, the analyzing module 207 analyzes the features to determine "least fun" conditions that cause a low score of a segment of the MCS. The "least fun" conditions include, but are not limited to, few participants appearing in the segment, few participants speaking in the segment, participants leaving the segment, unhappy faces, crying, text indicating negative aspects (e.g. lame, stupid, sucks) etc.

The analyzing module 207 uses the "fun" or "least fun" conditions to determine a score of a segment in the MCS. The segment is either a subset of the MCS or the entire MCS. The analyzing module 207 identifies the segments that have high scores as segments of interest in the MCS. In one embodiment, the analyzing module 207 identifies the most fun segments as having the highest scores and the least fun segments as having the lowest scores. For example, if the analyzing module 207 determines that scores range from 0 to 100, then 0 indicates the least fun segment and 100 indicates the most fun segment. Other scoring methods are possible. In one embodiment, the analyzing module 207 assigns a binary score to a segment. Score 0 means the most fun segment and score 1 means the least fun segment. In another embodiment, the analyzing module 207 assigns a score to each "fun" or "least fun" condition identified for a segment, normalizes and averages the scores to a specific range (e.g., −1 to 1), and uses the average score as the score of the segment. For example, assuming that a score assigned to each condition is between −10 to 10, the analyzing module 207 applies a two to a "fun" condition where people are talking loudly in a segment and −4 to a "least fun" condition where people are leaving the segment. The analyzing module 207 normalizes the scores for the "fun" condition and the "least fun" condition to −2/10=−0.2 and 4/10=0.4, respectively. The analyzing module 207 gets an average score (−0.2+0.4)/2=0.1 as the score for the segment.

In one embodiment, the analyzing module 207 determines a segment of interest that includes a beginning and an end of the segment of interest. In one embodiment, the analyzing module 207 identifies an entire segment determined by the feature extraction module 205 as a segment of interest and the boundary of the segment is the beginning and the end of the segment of interest. In another embodiment, the analyzing module 207 uses a subset of a segment determined by the feature extraction module 205 as a segment of interest and one or both of the beginning and the end of the segment of interest is within the boundary of the segment. For example, if the analyzing module 207 determines that 2/3 of a 6-minute long segment is very interesting (e.g., funny faces, loud music, etc.) and thereby assigns a high score to the segment, the analyzing module 207 may identify this 2/3 of the segment of interest (e.g., 4-minute long) as a segment of interest. In yet another embodiment, the analyzing module 207 combines portions of consecutive segments determined by the feature extraction module 205 as a segment of interest. For example, if the analyzing module 207 determines high scores for the first and second segments of a MCS (e.g., each segment is 3-minute long) because the two segments include a celebrity's enthusiastic and absorbing speech (e.g., 4-minute long), the analyzing module 207 may excerpt the four minute portions of the two segments that include the speech as a segment of interest.

In another embodiment, the analyzing module 207 determines a segment of interest that also includes a list of participants in the segment of interest. For example, the analyzing module 207 determines that 60 participants were counting down for fireworks in the beginning of a segment of interest, 85 participants were watching the fireworks explode and 70 participants were talking about how amazing the fireworks were in the end of the segment of interest. The analyzing module 207 includes the number and the names of participants in the segment of interest. In one embodiment, the analyzing module 207 transmits the segments of interest and associated scores to the summarizing engine 209. In another embodiment, the analyzing module 207 also stores the segments of interest and associated score in the storage 241.

The summarizing engine 209 is software including routines for generating a summary for a MCS that includes at least one segment of interest. In one embodiment, the summarizing engine 209 can be a set of instructions executable by the processor 235 to provide the functionality described below for generating the summary. In another embodiment, the summarizing engine 209 can be stored in the memory 237 of the computing device 200 and can be accessible and executable by the processor 235. The summarizing engine 209 can be adapted for cooperation and communication with the processor 235 and other components of the computing device 200 via the software communication mechanism 221.

In one embodiment, the summarizing engine 209 selects at least one segment of interest identified by the analyzing module 207 and generates a summary for a MCS to include the at least one segment of interest. In one embodiment, the summarizing engine 209 selects the most fun segments, i.e., the segments of interest that have the highest scores, and includes the most fun segments in the summary. In another embodiment, the summarizing engine 209 also determines a format of a summary for a MCS and selects the at least one segment of interest based on the format. The summary for the MCS can take forms such as a summarized video file with video and audio or a summarized series of pictures or a combination of the video file and the series of pictures. For example, the summary engine 209 determines to show short snippets of continuous video (e.g., by showing sequential frames of the at least one segment of interest) and a series of still thumbnails (e.g., by showing non-sequential frames of the at least one segment of interest) in the summary.

The summarizing engine 209 identifies events that occurred during the MCS to include in the summary. In one example, the summarizing engine 209 takes a subset of the video file as a summary for a MCS. For example, if the participants of the MCS shared a short funny video in the MCS that made everyone laugh, the summarizing engine 209 places the funny video in the summary of the MCS to amuse user that watch the summary. In another example, the summarizing engine 209 uses a series of animated pictures (e.g. graphics interchange fonts (GIFs)) as a summary of a MCS that has the largest amount of visual effects (e.g., a mask following a first participant's movement, a second participant wearing a moustache, etc.) in the summary to have a strong visual appeal.

In yet another embodiment, the summarizing engine 209 further determines a list of criteria that a summary of a MCS should meet and selects the at least one segment of interest based on the list of criteria. The list of criteria includes, but is not limited to, time duration, a number of appearances of a specific feature and a number of appearances of every user that joined the MCS. For example, the summarizing engine 209 includes a first segment of interest that shows each participant at least once and a second segment of interest that most participants are talking loudly in the summary of the MCS.

Once the summarizing engine 209 selects the at least one segment of interest from the segments of interest identified by the analyzing module 207, the summarizing engine 209 determines the characteristics for editing the at least one segment of interest and includes the at least one segment of interest and associated characteristics in the summary. In one embodiment, the characteristics comprise, but are not limited to, including the following information in the summary: an entire segment of interest, a partial segment of interest, portions of the segment of interest, the first one or more pictures or frames from the segment of interest, two or more segments of interest in the summary, the "must have" features in the summary that are associated with the segment of interest, etc.

The summarizing engine 209 generates a summary of a MCS for presenting to all users, a user who may be interested in the MCS or a user who missed the MCS. In one embodiment, the summarizing engine 209 determines the characteristics for all users associated with the at least one segment of interest and generates a first summary to include the at least one segment of interest and the determined characteristics. For example, the summarizing engine 209 determines that the video feature indicating that most participants are laughing in the segment of interest should be presented in a first picture of a summary. Other examples include that the summarizing engine 209 places the first three consecutive frames of the first segment of interest and the last 7 frames of the second segment of interest in a series of pictures used as a summary of a MCS. Or the summarizing engine 209 includes a 2-minute climax where everyone is singing and dancing together with a singer and a 1-minute encore of the singer from a 4-minute segment of interest in a summary for a music show.

In another embodiment, the summarizing engine 209 determines personalized characteristics for a user associated with the at least one segment of interest and generates a second summary for the user to include the personalized characteristics. In one embodiment, the summarizing engine 209 receives social affinity scores between the user and participants in the at least one segment of interest from the social network application 203 and determines the personalized characteristics based on the social affinity scores. The summarizing engine 209 generates the second summary that is specific for an individual user. The individual user can be a user who is interested in the MCS or a user who missed the MCS. For example, the summarizing engine 209 puts more pictures that have a first user on them in a summary customized for a second user because the summarizing engine 209 receives a higher social affinity score between the first user and the second user than other participants. In another example, the social network application 203 determines a high affinity score between a first user and a second user because the first user frequently consults with the second user (e.g., a real estate agent) about how to buy a house. When the summarizing engine 209 summarizes a lecture from several real estate agents for the first user, the summarizing engine 209 rearranges the order of segments of interest and starts the summary with the lecture of the second user. In another example, when generating a summary of a celebrity party for a user, the summarizing engine 209 makes thumbnails of pictures including one of the celebrities as the first picture of the summary since the user has been following this celebrity for a long time.

In one embodiment, the summarizing engine 209 incorporates with the user interface engine 211 to present either or both of the first and second summaries to all users or an individual user. In another embodiment, the summarizing engine 209 provides the first and second summaries to all users or a user by other communication means such as an email or an instant message.

The user interface engine 211 can be software including routines for generating a user interface that displays a summary for a MCS, user profiles (e.g. posts, name, education, working history) and a social network (e.g. posts, photos, videos, comments). In one embodiment, the user interface engine 211 can be a set of instructions executable by the processor 235 to provide the functionality described below for generating the user interface. In another embodiment, the user interface engine 211 can be stored in the memory 237 of the computing device 200 and can be accessible and executable by the processor 235. The user interface engine 211 can be adapted for cooperation and communication with the processor 235 and other components of the computing device 200 via the software communication mechanism 221.

In one embodiment, the user interface engine 211 receives a first summary for a MCS from the summarizing engine 209 and provides graphic data to present the first summary to all users on a social network. In another embodiment, the user interface engine 211 receives a second summary for a MCS from the summarizing engine 209 and provides graphic data to present the second summary to an individual user in the social network.

In one embodiment, the user interface engine 211 generates graphical data for displaying a summary of a MCS in a user's stream in the social network. For example, the user interface engine 211 generates a post "Jerry had a video conference with Mary and John" along with a link to a summary for the video conference in Tom's stream to remind Tom to view the summary. In another embodiment, the user interface engine 211 provides graphic data to present a summary for a MCS in a specific area of a webpage associated with a user in social network. For example, the user interface engine 211 generates a "MCS promotion" button in a navigation bar of a user profile webpage associated with a user in a social network. When the user clicks the "MCS promotion" button, the user can view a summary for a MCS. In yet another embodiment, the user interface engine 211 provides graphic data to present a summary for a MCS in a specific area of a standalone webpage. For example, the user interface engine 211 generates graphic data to display "the best MCS of the last week that you missed" in a webpage that advertises MCS features. In yet another embodiment, the user interface engine 211 generates graphical data for displaying a notification on a user interface about a summary for a MCS. For example, the user interface engine 211 generates a pop-up notification box on a screen of a user's phone. The user interface engine 211 includes an icon that links to a summary of a MCS in the notification box to notify a user what an amazing MCS the user missed.

Figure 3:
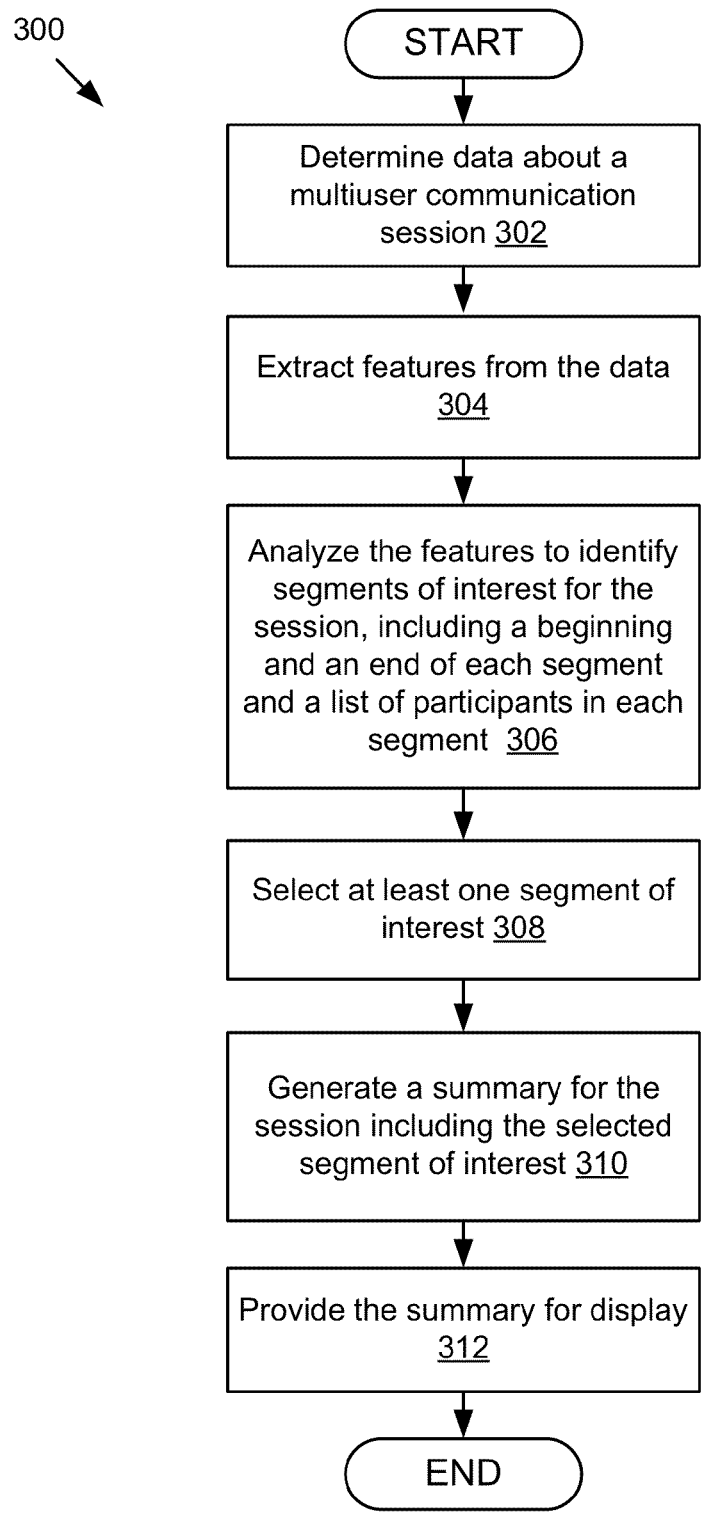
FIG. 3 is a flowchart of an example method for summarizing a MCS.

Referring now to FIGS. 3, 4A-4C, 5A-5B and 6A-6B, various example methods and graphic representations of example user interfaces of the specification will be described. FIG. 3 includes a flowchart 300 of an example method for using a summarizing application 103 to summarize a MCS to include at least one segment of interest. The summarizing application 103 includes a processing unit 201, a feature extraction module 205, an analyzing module 207, a summarizing engine 209 and a user interface engine 211. The processing unit 201 receives 302 data about a MCS and passes the data to the feature extraction module 205. The feature extraction module 205 extracts 304 features from the data. In one embodiment, the feature extraction module 205 extracts at least one of a video feature, an audio feature or a text feature from the received data. The analyzing module 207 analyzes 306 the features to identify segments of interest in the MCS. In one embodiment, the segments of interest include at least a beginning and an end of each segment of interest and a list of participants in each segment of interest. The summarizing engine module 209 selects 308 at least one segment of interest from the identified segments of interest and generates 310 a summary for the MCS that includes the selected segment of interest. The summarizing engine 209 incorporates with the user interface engine 211 to present 312 the summary for display.

Figure 4A:
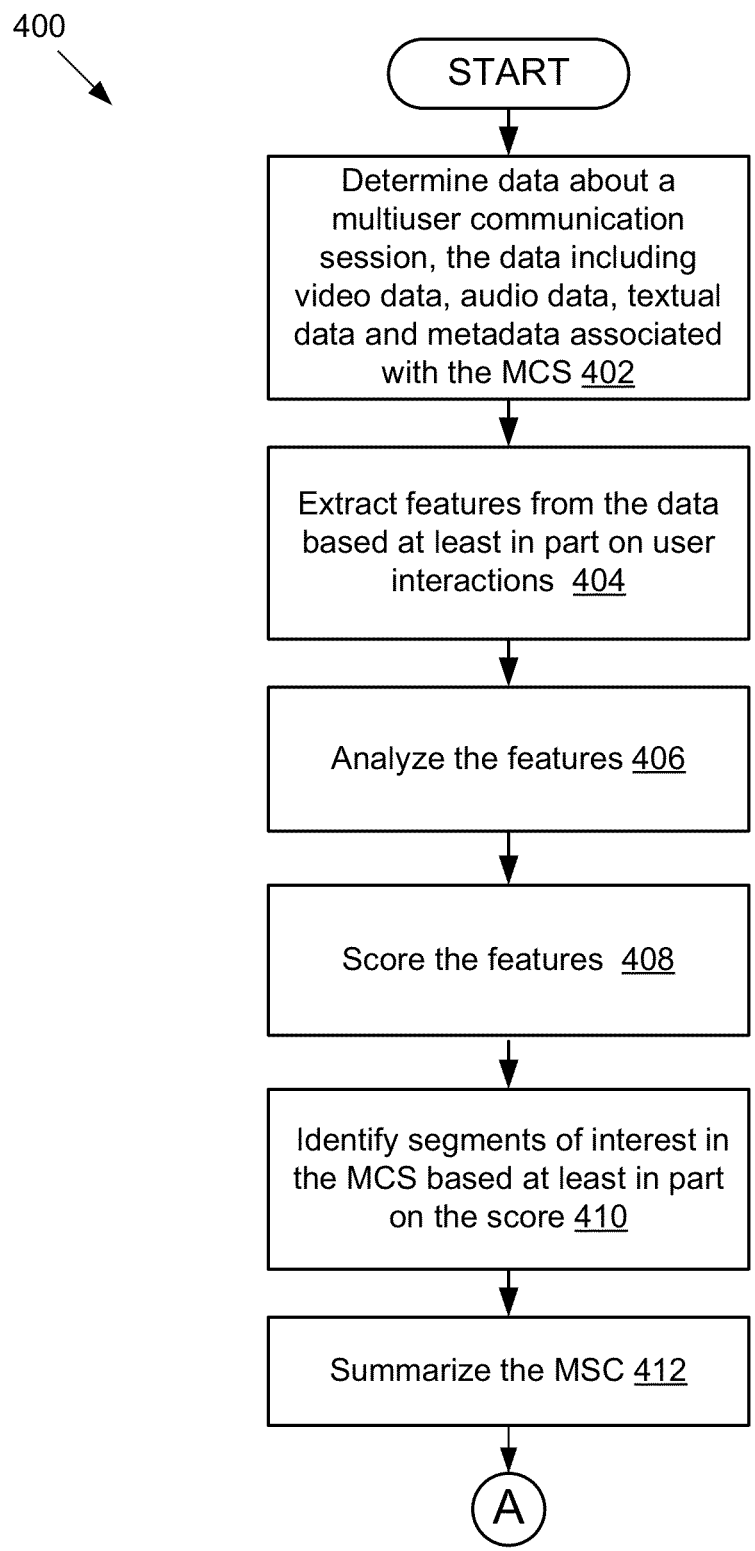
FIGS. 4A-4C are flowcharts of an example method for summarizing a MCS.
Figure 4B:
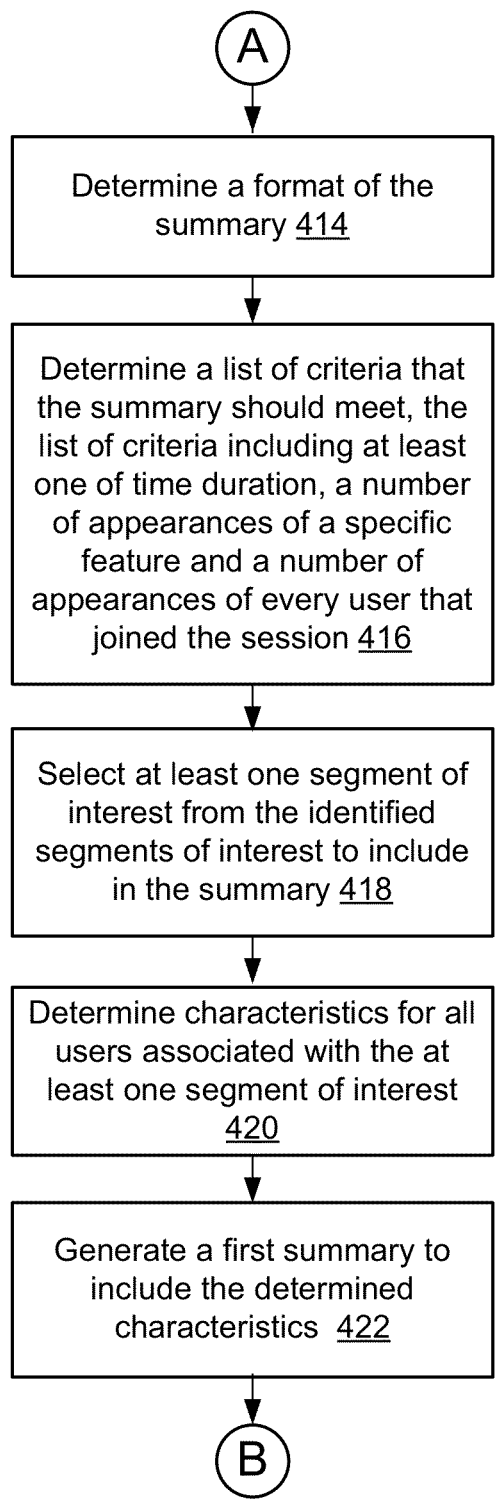
Figure 4C:
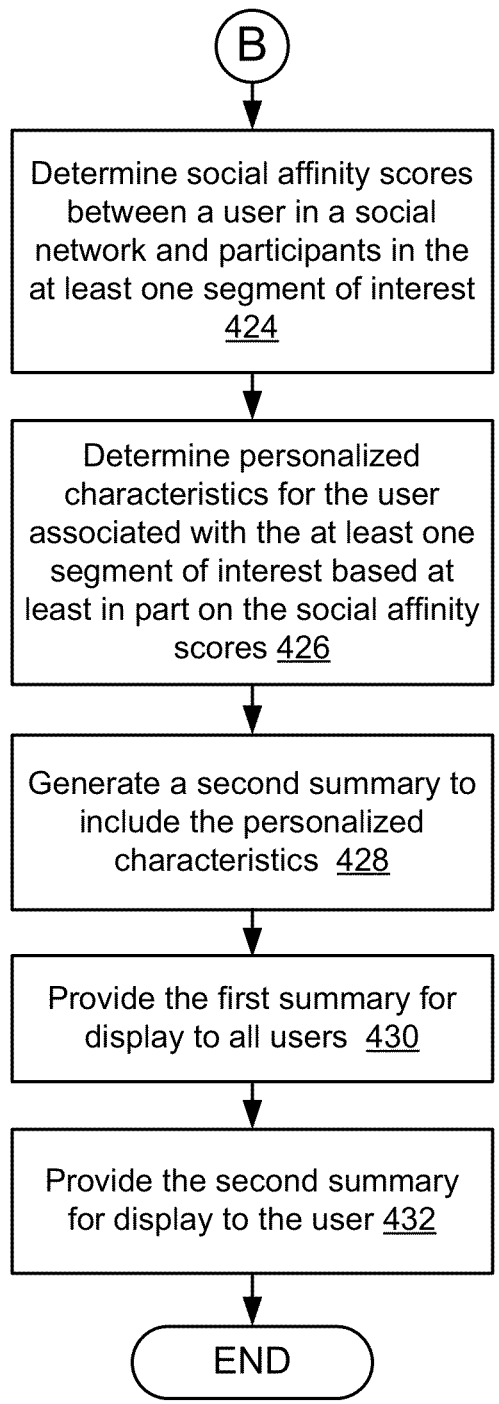

FIGS. 4A-4C include flowcharts 400 of an example method for using a summarizing application 103 to summarize a MCS to include at least one segment of interest. The summarizing application 103 includes a processing unit 201, a social network application 203, a feature extraction module 205, an analyzing module 207, a summarizing engine 209 and a user interface engine 211.

Referring to FIG. 4A, the processing unit 201 receives 402 data about a MCS. The data about the MCS includes video data, audio data, textual data and metadata associated with the MCS. The processing unit 201 transmits the data to the feature extraction module 205.

The feature extraction module 205 extracts 404 features from the data based at least in part on user interactions in each segment of the MCS. In one embodiment, the feature extraction module 205 determines segments of the MCS and extracts features associated with each segment of the MCS from the received data. For example, the feature extraction module 205 determines 6 segments for a 24-minute MCS and each segment is 4-minute long.

In one embodiment, the feature extraction module 205 extracts the features that include at least one of a video feature, an audio feature and a text feature. In one embodiment, the video feature includes a face of a participant, a face indicative of an emotion or displaying of a specific item. In one embodiment, the audio feature includes at least one of laughter by participants, crying by the participants, a number of the participants talking at once, a volume of the participants talking, text from the participants that talked, a background sound and silent time. In one embodiment, the text feature includes at least one of appearance of specific text and a number of appearances of the specific text. The feature extraction module 205 transmits the features associated with each segment to the analyzing module 207.

The analyzing module 207 analyzes 406 the features associated with each segment. The analyzing module 207 scores 408 each segment based on analyzing the features and identifies 410 segments of interest based at least in part on the score. In one embodiment, the analyzing module 207 analyzes the features (e.g., by determining a frequency of appearances of a phrase, a number of faces showing on the screen, a gesture of a user, etc.) to determine "fun" conditions that contribute to a high score of a segment of the MCS and "boring" conditions that cause a low score of a segment of the MCS. The "fun" conditions include, but are not limited to, that many users are present in the segment, many participants are talking at once, many participants are talking loudly, many participants are sending text messages, many participants are smiling or crying, many participants are wearing moustaches or antlers in the segment, many participants are watching a popular video together, many participants are acting concurrently (e.g., waving hands or singing at the same time), invitations are being sent out to other users, other users are participating in the segment, etc. In another embodiment, the analyzing module 207 analyzes the features to determine "boring" conditions that cause a low score of a segment of the MCS. The "boring" conditions include, but are not limited to, that few participants show up in the segment, few participants are speaking in the segment, participants are leaving the segment, etc.

The analyzing module 207 identifies the segments that have high scores as segments of interest in the MCS. In one embodiment, the analyzing module 207 determines a segment of interest that includes a beginning and an end of the segment of interest. The summarizing engine 209 receives the segments of interest identified by the analyzing module 207 to summarize 412 the MCS.

Referring now to FIG. 4B, the summarizing engine 209 determines 414 a format of the summary. For example, the summary for the MCS can take forms such as a summarized video file with video and audio or a summarized series of pictures or a combination of the video file and the series of pictures. The summarizing engine 209 determines 416 a list of criteria that the summary should meet. The list of criteria includes at least one of time duration, a number of appearances of a specific feature and a number of appearances of every user that joined the MCS.

The summarizing engine 209 selects 418 at least one segment of interest from the identified segments of interest to include in the summary. In one embodiment, the summarizing engine 209 selects the at least one segment of interest based on the format. For example, if the summarizing engine 209 uses a series of animated pictures as a summary of a MCS, the summarizing engine 209 may include a segment of interest that has the largest amount of visual effects (e.g., a mask following a first participant's movement, a second participant wearing a moustache, etc.) in the summary to have a strong visual appeal. In another embodiment, the summarizing engine 209 selects the at least one segment of interest based on the list of criteria. For example, the summarizing engine 209 includes a first segment of interest that shows each participant at least once and a second segment of interest that most participants are talking loudly in the summary.

The summarizing engine 209 determines the characteristics about editing of the at least one segment of interest and generates the summary to include the at least one segment of interest and the characteristics. The summarizing engine 209 determines 420 characteristics for all users associated with the at least one segment of interest and generates 422 a first summary to include the determined characteristics. For example, the summarizing engine 209 determines that the video feature indicating that most participants are laughing in the segment of interest should be presented in a first picture of a summary.

Referring to FIG. 4C, the social network application 203 determines 424 social affinity scores between a user in a social network and participants in the at least one segment of interest. For example, the social network application 203 generates a high affinity score for two users that follow each other and that frequently interact with each other.

The summarizing engine 209 determines 426 personalized characteristics for the user associated with the at least one segment of interest based at least in part on the social affinity score determined by the social network application 203 and generates 428 a second summary to include the personalized characteristics. For example, the summarizing engine 209 puts more pictures that have a first user on them in a summary customized for a second user because the summarizing engine 209 receives a higher social affinity score between the first user and the second user than other participants.

The summarizing engine 209 incorporates with the user interface engine 211 to present 430 the first summary for display to all users. The summarizing engine 209 incorporates with the user interface engine 211 to present 432 the second summary for display to the user. In one embodiment, the summarizing engine 209 also provides the first and second summaries to all users or a user by other communication means such as an email or an instant message.

Figure 5A:
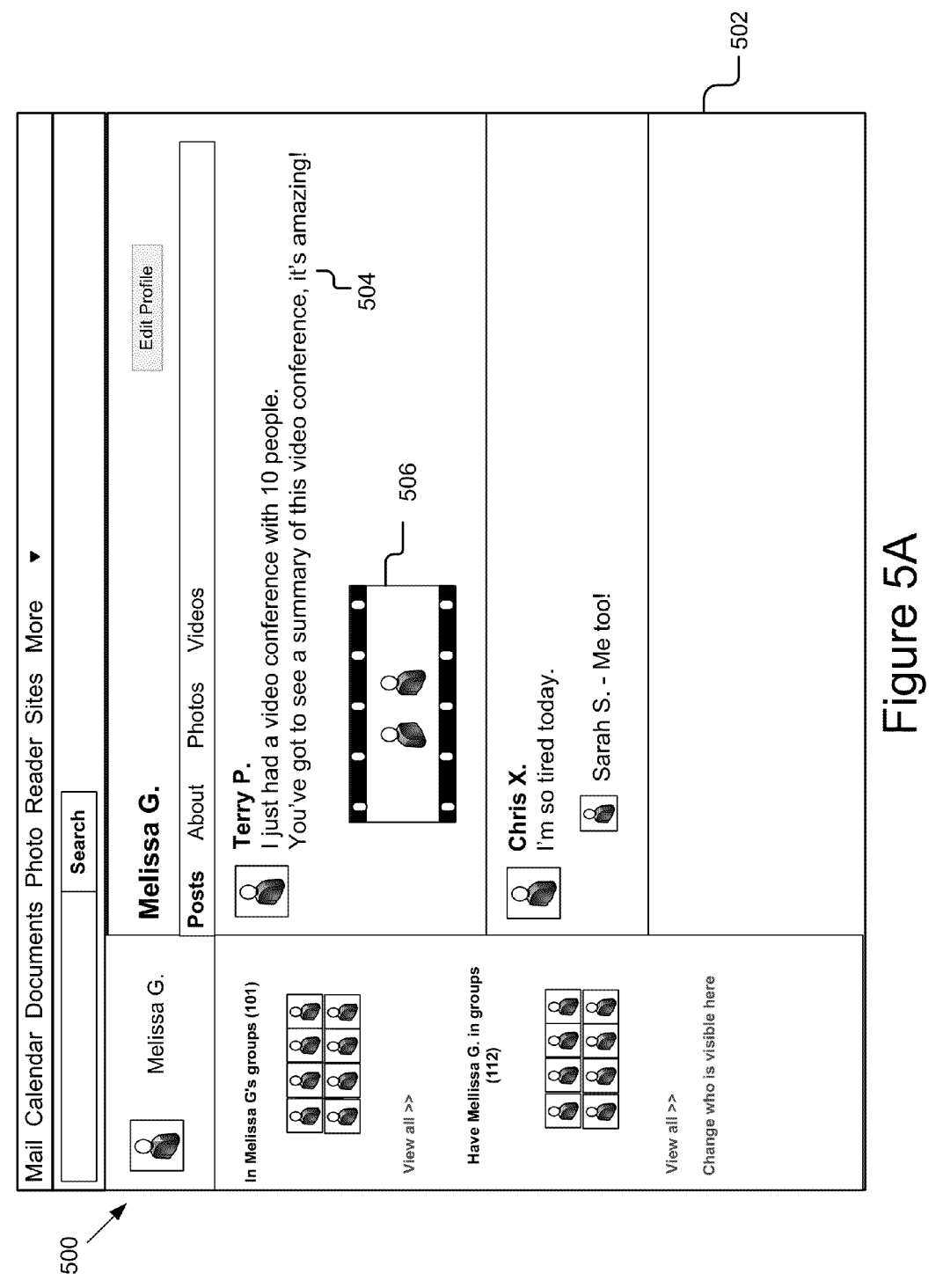

FIG. 5A is an example graphic representation of a user interface 500 generated by the user interface engine 211. In this example, the user interface 500 displays a stream 502 for Melissa G. in a social network. The stream includes a post 504 from Terry P., who is connected with Melissa in the social network. Terry tells Melissa in the post 504 that he had a video conference with 10 people. The feature extraction module 205 receives the video data, audio data, textual data and other data about the video conference and extracts features from the received data. The analyzing module 207 analyzes the features to identify segments of interest for the video conference. The summarizing engine 209 selects at least one segment of interest from the segments of interest and generates a summary 506 for the video conference to include the at least one segment of interest. Terry shares the summary 506 with Melissa in the post 504.

Figure 5B:
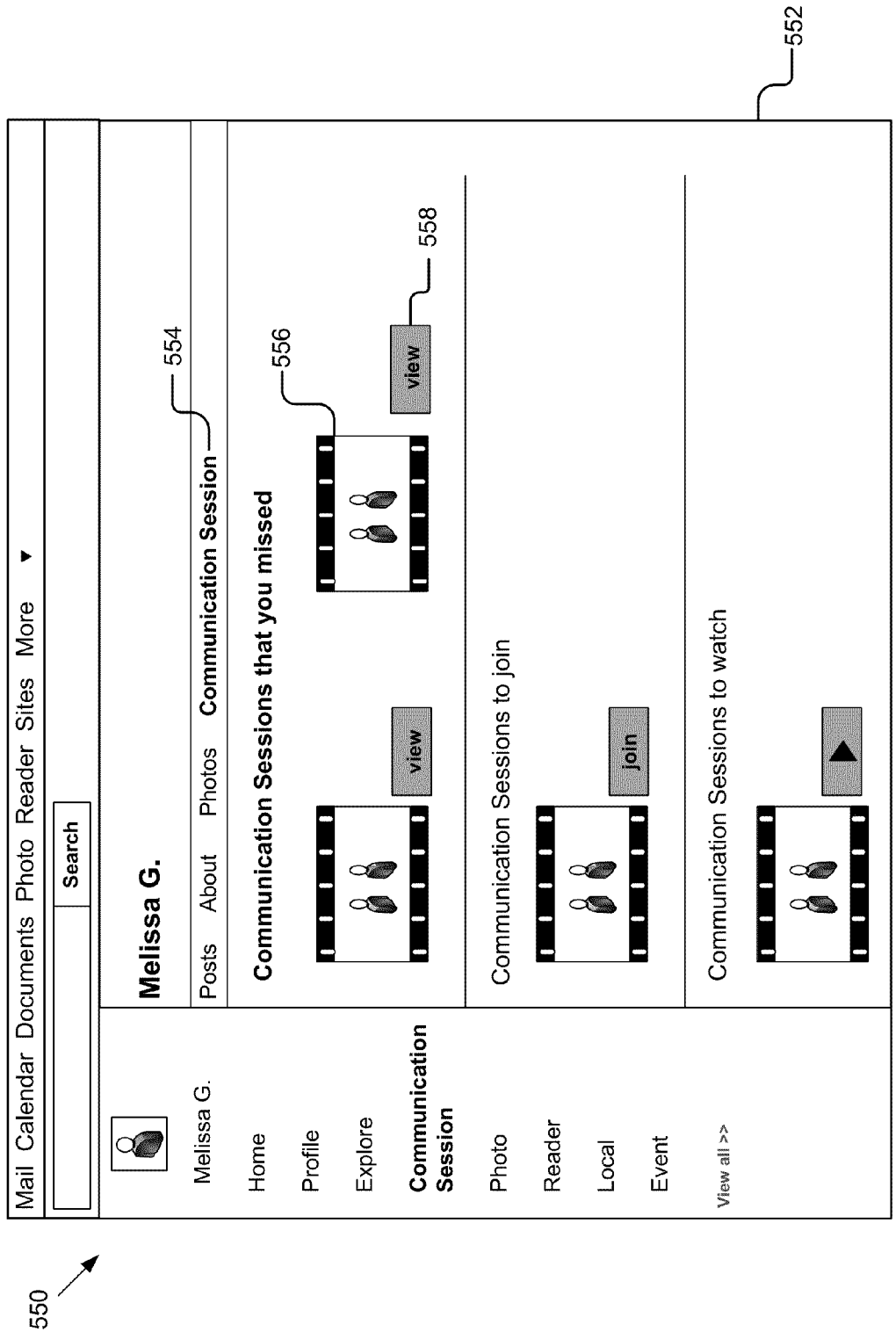

FIG. 5B is an example graphic representation of a user interface 550 generated by the user interface engine 211. In this example, the user interface 550 displays a stream 552 for Melissa G. in a social network. The stream includes a communication session area 554 that includes three portions: a first area showing communication sessions that Melissa missed, a second area showing communication sessions that Melissa likes to join and a third area showing communication sessions that Melissa wants to watch. The summarizing engine 209 incorporates with other components in the summarizing application 103 to generate a summary 556 for a multiuser communication session in the first area. Melissa can select a button 558 to view the summary 556.

Figure 6A:
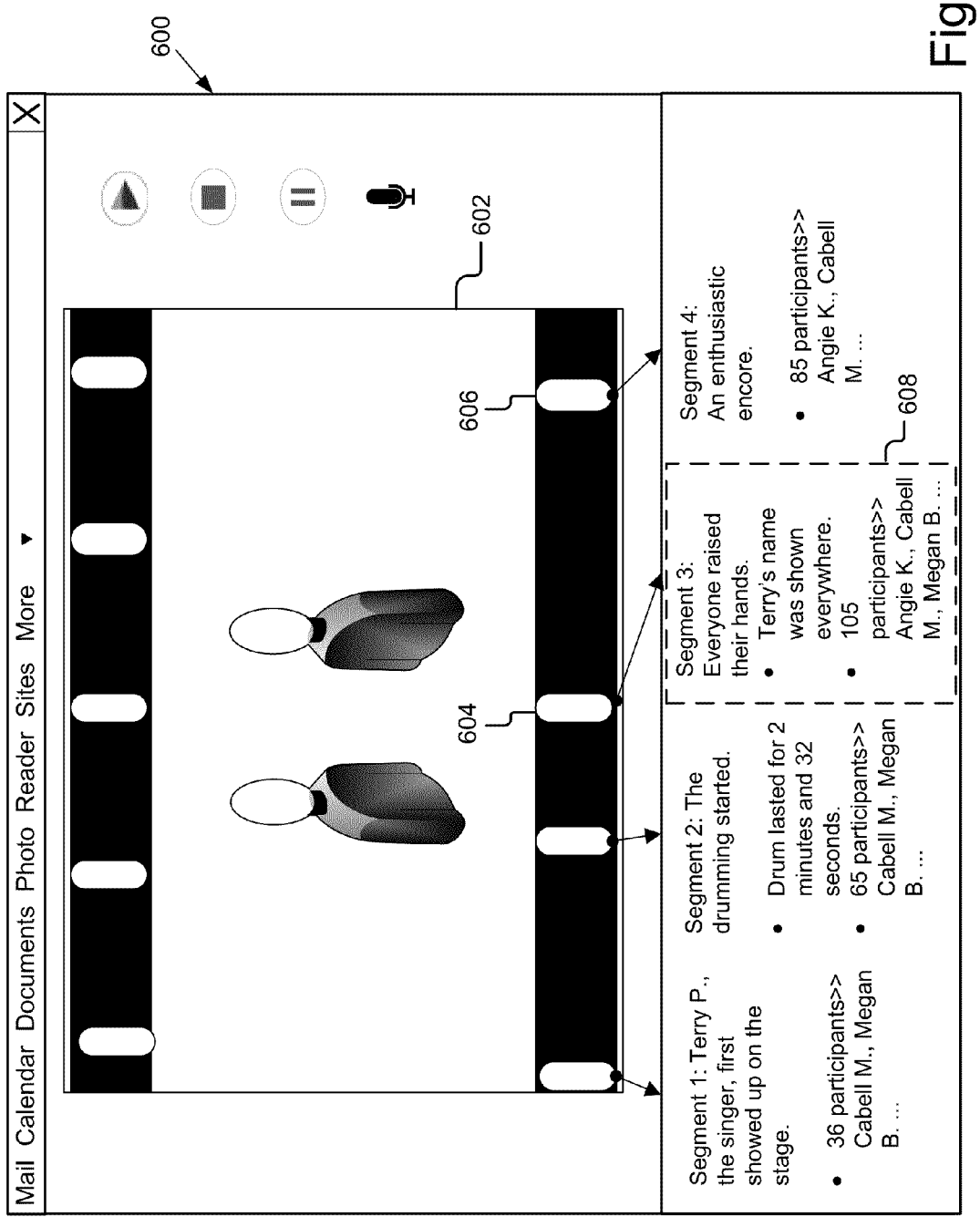
FIGS. 6A and 6B are example graphic representations of summaries of a MCS.

FIG. 6A is an example graphic representation of a user interface 600 generated by the user interface engine 211. In this example, the user interface 600 displays a summary 602 for Terry P.'s music show with his friends and fans. The summary 602 is generated for all users. The summarizing engine 209 selects four segments of interest to include in the summary 602. Each segment of interest includes a beginning and an end of the segment of interest. For example, the third segment of interest includes a starting point 604 and an ending point 606. Each segment of interest also includes a number of participants in the segment of interest. For example, the summarizing engine 209 lists in an area 608 the names of 105 users who participated in the third segment of interest. In this example summary 602, the summarizing engine 209 further includes a short description for "fun" conditions of each segment of interest. For example, the summarizing engine 209 describes "everyone hands up" and "Terry's name was shown everywhere" in the area 608 which represent the two "fun" conditions of the third segment of interest identified by the analyzing module 207.

Figure 6B:
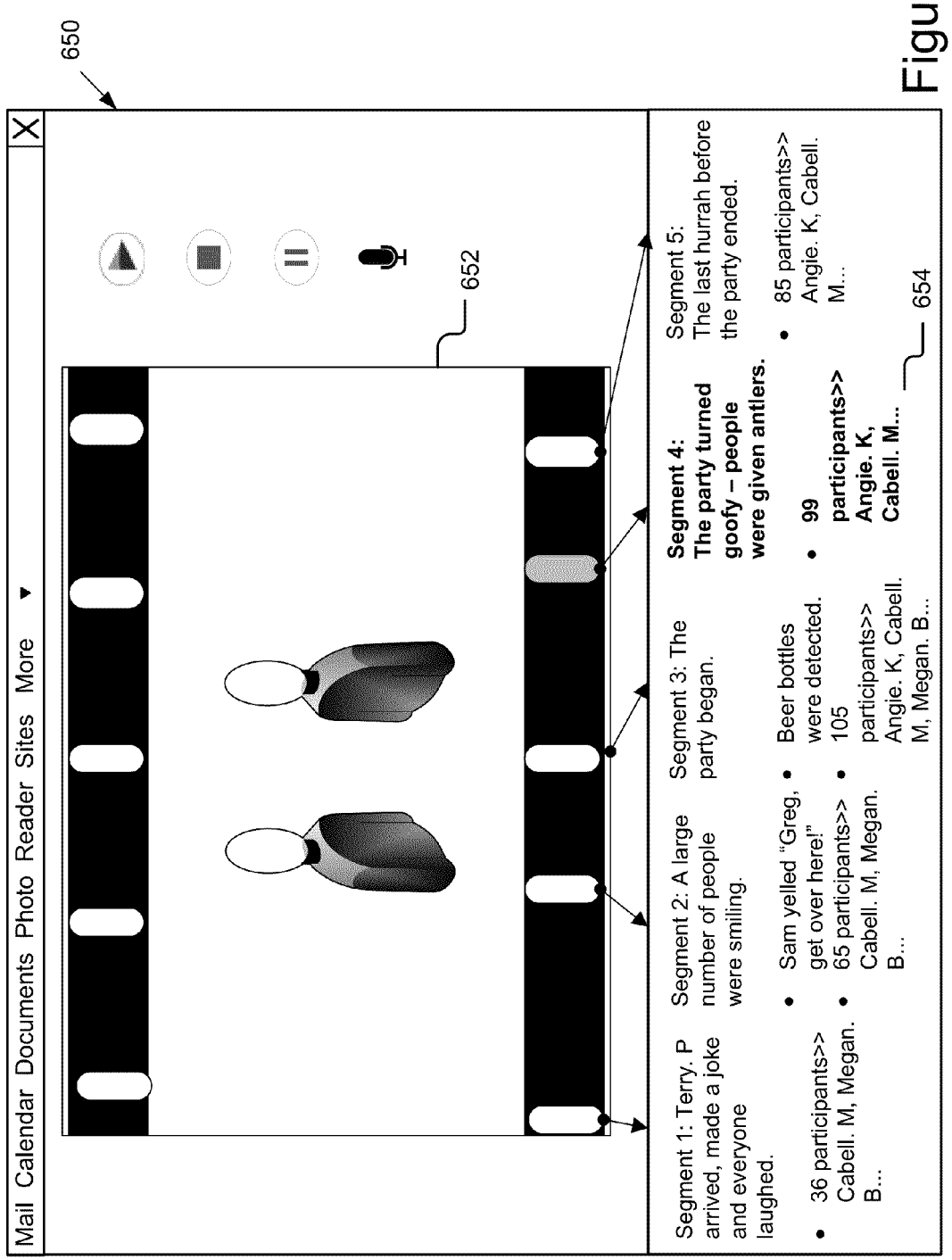

FIG. 6B is an example graphic representation of a user interface 650 generated by the user interface engine 211. In this example, the user interface 650 displays a summary 652 for Terry P.'s music show. The summary 652 is generated for a specific user, for example, Melissa G. who missed Terry's show. The summarizing engine 209 selects five segments of interest to include in the summary 652 that is presented to Melissa. In particular, the summarizing engine 209 includes a fourth segment of interest that has a "fun" condition "the party turned goofy-people were given antlers" in an area 654 of the summary 652 because user interactions between Melissa and Angie (i.e., one of participants in the MCS) shows that Melissa loves different kinds of visual effects.

In the following description, for purposes of explanation, numerous specific details are set forth in order to provide a thorough understanding of the specification. It will be apparent, however, to one skilled in the art that the technology can be practiced without these specific details. In another embodiment, structures and devices are shown in block diagram form in order to avoid obscuring the description. For example, the specification is described in one embodiment above with reference to user interfaces and particular hardware. However, the description applies to any type of computing device that can receive data and commands, and any peripheral devices providing services.

Reference in the specification to "some instances" or "an instance" means that a particular feature, structure, or characteristic described in connection with the instance is included in at least some instances of the description. The appearances of the phrase "in one embodiment" in various places in the specification are not necessarily all referring to the same instance.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instances, an entirely software instance or instances containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
determining, using one or more computing devices, one or more segments from a multiuser communication session;
analyzing, using the one or more computing devices, features extracted from the one or more segments;
scoring, using the one or more computing devices, the one or more segments in the multiuser communication session based on analyzing the extracted features;
identifying segments of interest from the one or more segments of the multiuser communication session based at least in part on the scores, the segments of interest including a beginning and an end of each segment of interest and a list of participants in each segment of interest;
determining, using the one or more computing devices, social affinity scores between a user in a social network and participants in at least one segment of interest;
determining, using the one or more computing devices, a personalized characteristic for the user associated with the at least one segment of interest based at least in part on the social affinity scores;
editing the at least one segment of interest based on the personalized characteristic by including a larger number of appearances of a first participant than a second participant in the at least one segment of interest based on determining that a social affinity score between the user and the first participant is higher than a social affinity score between the user and the second participant; and
generating, using the one or more computing devices, a summary of the multiuser communication session for the user, the summary including the edited segment of interest.

2. A computer-implemented method comprising:
determining, using one or more computing devices, one or more segments from a multiuser communication session;
extracting, using the one or more computing devices, features from the one or more segments;
analyzing, using the one or more computing devices, the extracted features to identify segments of interest for the multiuser communication session including a beginning and an end of each segment of interest and a list of participants in each segment of interest;
determining a personalized characteristic for a user associated with at least one segment of interest;
editing the at least one segment of interest based on the personalized characteristic by including a larger number of appearances of a first participant than a second participant in the at least one segment of interest based on determining that a social affinity score between the user and the first participant is higher than a social affinity score between the user and the second participant; and
generating, using the one or more computing devices, a summary of the multiuser communication session for the user, the summary including the edited segment of interest.

3. The method of claim 2, further comprising:
determining social affinity scores between the user in a social network and participants in the at least one segment of interest; and
wherein determining the personalized characteristic for the user associated with the at least one segment of interest is based at least in part on the social affinity scores.

4. The method of claim 3, wherein determining the social affinity scores between the user in the social network and the participants in the at least one segment of interest is based on at least one of user interactions between the user and the participants and relationship information between the user and the participants.

5. The method of claim 2, further comprising:
scoring the one or more segments in the multiuser communication session; and
wherein identifying the segments of interest is based at least in part on the scores.

6. The method of claim 2, further comprising:
determining a list of criteria that the summary should meet; and
wherein generating the summary including the edited segment of interest is based at least in part on the list of criteria.

7. The method of claim 6, wherein the list of criteria comprises at least one of time duration, a number of appearances of a specific feature in the summary and a number of appearances of every user who joined the multiuser communication session in the summary.

8. The method of claim 2, further comprising:
determining a format of the summary; and
wherein generating the summary including the edited segment of interest is based at least in part on the format.

9. The method of claim 8, wherein the video feature comprises at least one of a face of a participant, a face indicative of an emotion and display of a specific item.

10. The method of claim 8, wherein the audio feature comprises at least one of laughter by at least one participant, crying by at least one participant, a number of the participants that talked at once, a volume of the participants talking, a speech to text conversation of audio from the participants that talked, a background sound and silent time.

11. The method of claim 8, wherein the text feature comprises at least one of an appearance of text and a number of appearances of the text.

12. The method of claim 2, wherein the features comprise at least one of a video feature, an audio feature and a text feature.

13. A system for comprising:
one or more processors, the one or more processors being configured to:
determine one or more segments from a multiuser communication session;
extract features from the one or more segments;
analyze the extracted features to identify segments of interest for the multiuser communication session including a beginning and an end of each segment of interest and a list of participants in each segment of interest;
determine a personalized characteristic for a user associated with at least one segment of interest;
edit the at least one segment of interest based on the personalized characteristic by including a larger number of appearances of a first participant than a second participant in the at least one segment of interest based on determining that a social affinity score between the user and the first participant is higher than a social affinity score between the user and the second participant; and
generate a summary of the multiuser communication session for the user, the summary including the edited segment of interest.

14. The system of claim 13, wherein the one or more processors are further configured to:
determine social affinity scores between the user in a social network and participants in the at least one segment of interest; and
wherein determining the personalized characteristic for the user associated with the at least one segment of interest is based at least in part on the social affinity scores.

15. The system of claim 14, wherein determining the social affinity scores between the user in the social network and the participants in the at least one segment of interest is based on at least one of user interactions between the user and the participants and relationship information between the user and the participants.

16. The system of claim 13, wherein the one or more processors are further configured to:
score the one or more segments in the multiuser communication session; and
wherein identifying the segments of interest is based at least in part on the scores.

17. The system of claim 13, wherein the one or more processors are further configured to:
determine a list of criteria that the summary should meet; and
wherein generating the summary including the edited segment of interest is based at least in part on the list of criteria.

18. A computer program product comprising a non-transitory computer usable medium including a computer readable program, wherein the computer readable program when executed on a computer causes the computer to:
determine one or more segments from a multiuser communication session;
extract features from the one or more segments;
analyze the extracted features to identify segments of interest for the multiuser communication session including a beginning and an end of each segment of interest and a list of participants in each segment of interest;
determine a personalized characteristic for a user associated with at least one segment of interest;
edit the at least one segment of interest based on the personalized characteristic by including a larger number of appearances of a first participant than a second participant in the at least one segment of interest based on determining that a social affinity score between the user and the first participant is higher than a social affinity score between the user and the second participant; and
generate a summary of the multiuser communication session for the user, the summary including the edited segment of interest.

19. The computer program product of claim 18, wherein the computer readable program when executed on the computer further causes the computer to:
determine social affinity scores between the user in a social network and participants in the at least one segment of interest; and
wherein determining the personalized characteristic for the user associated with the at least one segment of interest is based at least in part on the social affinity scores.

20. The computer program product of claim 19, wherein determining the social affinity scores between the user in the social network and the participants in the at least one segment of interest is based on at least one of user interactions between the user and the participants and relationship information between the user and the participants.

* * * * *